(12) United States Patent
Jin

(10) Patent No.: US 6,789,097 B2
(45) Date of Patent: Sep. 7, 2004

(54) REAL-TIME METHOD FOR BIT-REVERSAL OF LARGE SIZE ARRAYS

(75) Inventor: Dongxing Jin, Ottawa (CA)

(73) Assignee: Tropic Networks Inc., Kanata, Ontario (CA)

( * ) Notice: Subject to any disclaimer, the term of this patent is extended or adjusted under 35 U.S.C. 154(b) by 632 days.

(21) Appl. No.: 09/900,153

(22) Filed: Jul. 9, 2001

(65) Prior Publication Data

US 2003/0028571 A1 Feb. 6, 2003

(51) Int. Cl.⁷ .................................................. G06F 17/14
(52) U.S. Cl. ...................................................... 708/400
(58) Field of Search ................................. 708/400, 402, 708/403, 404, 405, 410

(56) References Cited

U.S. PATENT DOCUMENTS

| | | | |
|---|---|---|---|
| 4,241,411 A | * 12/1980 | Krasner et al. | 708/404 |
| 4,823,297 A | * 4/1989 | Evans | 708/400 |
| 5,329,474 A | * 7/1994 | Yamada | 708/404 |
| 5,369,762 A | 11/1994 | Wolf | |
| 5,682,340 A | 10/1997 | Arends et al. | |
| 5,724,534 A | 3/1998 | Boursier et al. | |
| 6,073,154 A | * 6/2000 | Dick | 708/401 |
| 6,351,758 B1 | * 2/2002 | Courtney et al. | 708/404 |
| 6,609,140 B1 | * 8/2003 | Greene | 708/404 |
| 2003/0009467 A1 | * 1/2003 | Perrizo | 707/100 |

* cited by examiner

*Primary Examiner*—David H. Malzahn
(74) *Attorney, Agent, or Firm*—Victoria Donnelly

(57) ABSTRACT

A digital signal processor DSP for bit-reversal of a large data array of a size has a direct memory access (DMA) controller for performing in-place bit reversal routines on an external memory during a first stage, and a central processing unit (CPU) for swapping small sub-arrays on internal memory in a second stage. The two stage method according to the invention importantly reduces the real-time implementation for sorting large size data arrays on uni-processor DSP platforms, by extensively using the external memory and avoiding a random access to the internal memory. As well, the invention provides for improved dense integration and reduced costs when used in dense wavelength division multiplexing (DWDM) systems.

17 Claims, 4 Drawing Sheets

REAL-TIME METHOD FOR BIT-REVERSAL OF LARGE SIZE ARRAYS

FIELD OF THE INVENTION

This invention relates to discrete transforms of data, and in particular to a real-time method for bit-reversal of large size data arrays.

BACKGROUND TO THE INVENTION

In information transfer systems, analog data received from a user are converted to an equivalent digital format represented by a succession of bits. Efficient digital data transmission and storage is often achieved using compression techniques. A common technique for compressing data includes converting digital data from a time domain format to a frequency domain format. Discrete transforms like the FFT (fast Fourier transform), DCT (discrete cosinus transform), IDCT (inverse discrete cosinus transform), DST (discrete sinus transform), Fast Walsh Transform (FWT), Fast Hadamard Transform (FHT), etc., take discrete inputs in one format and convert them to discrete outputs in another. For example, the FFT is typically used to transform digital data from the time domain to digital data format in the frequency domain.

Many discrete transforms are executed "in place" using the same memory locations for both the inputs and the outputs. This technique is used to reduce the memory needed for the execution of the transform and also to reduce the complexity of the transform algorithms. During certain steps in the FFT, and other discrete transform routines, a bit-reversed order representation of the data is produced, so that the data needs to be thereafter reversed to the normal order. Thus, the circuitry performing the discrete transform must include routines that perform complex operations such as shifting of data for bit-reversal, including transfer or moving. In digital telecommunications, bit-reversal routines are used for example for signal modulation/demodulation, signal features extraction, error detection and correction.

In general, a data terminal includes one or more Digital Signal Processors (DSP). A DSP is a special central processing unit (CPU) designed to manipulate data to perform a specific function on the input data. The DSP comprises a small internal memory for storing data and codes and also a number of internal registers for exchanging information with the external memory. DSPs generally operate in load-store mode, where the arithmetic and logic instructions use the internal registers. Data are retrieved (loaded) from the internal or external memory and loaded into the data registers using a LOAD instruction, and data are saved (stored) from the registers into the memory using a STORE instruction. Each load/store operation requires an address into the memory. These addresses are usually held in address registers. An address stored in a register is often referred to as a "pointer" because it points to a location in the memory, also referred as an index.

Bit-reverse and digit-reverse are routines in which the data is "re-ordered" by reversing the pointer value (the index) from 0 to (N−1), where "N" is the number of points to be digit/bit-reversed. The paper "Bit-Reverse and Digit Reverse: Linear-Time Small Look-up Table Implementation for the TMS320C6000", by Chad Courtney, published May 1998, Texas Instruments Incorporated SPRA440, describes bit reversal and digit reversal routines which sort the indices of the addresses of the data in a memory using a sorting tree. The pointers are stored in an array of $2^N$ registers of "N" bits. The pointers are sorted starting with the most significant bit (MSB) of the bit-reversed order and ending with the least significant bit (LSB) so that the sorting routine is repeated for (N−1) times. The size of the memory necessary for performing bit/digit reversal routine is denoted with "N" and includes besides the memory space occupied by the indices, the space occupied by a look-up table which occupies a multiple of "N" bytes.

As indicated above, the bit reversal operation is effected "in place" on the external memory, which stores the intermediate or final results of the respective discrete transform. In the case of a uni-processor platform, bit reversal is time consuming, due mainly to the load and store operations performed on each entry of the array. This is because in most cases, the size of the available internal memory is much smaller (2 to 100 times) than the size of the array to be reversed. In addition, the array needs to be randomly accessed, which involves use of large index tables. Furthermore, a large overhead compared to the available hardware is required to meet the real-time requirement when sorting large size data arrays.

Accordingly, there is a need for a real-time method for sorting large size data arrays using bit-reversal routines on uni-processor DSP platforms.

SUMMARY OF THE INVENTION

The present invention seeks to overcome the disadvantages of the prior art associated with real-time, bit-reversal of large size data arrays on uni-processor platforms.

According to one aspect of the invention, a method for bit reversal of large data array on a uni-processor platform is provided. In a first stage, the method comprises the steps of determining the ratio K between the size $M \times 2^M$ of the large data array stored in an external memory, and the size $M \times 2^Q$ of a small array, available on an internal memory, such that K+Q=M; performing an in-place bit reversal operation for K bits of the large data array on external memory. These steps are performed by a direct memory access controller (DMA). In a second stage, a central processing unit (CPU) performs a bit reversal operation of small array on internal memory.

According to another aspect of the invention, a digital signal processor (DSP) for bit-reversal of a large data array is provided. The DSP comprises a direct memory access (DMA) controller for in-place bit reversing a number of bits of the large size data array on an external memory and a central processing unit (CPU) for performing swapping of small size sub-arrays on internal memory.

Advantageously, the two-stage method according to the invention importantly reduces the real-time implementation for sorting large size data arrays on uni-processor DSP platforms, by extensively using the external memory and avoiding a random access to the internal memory. As well, the invention provides for improved dense integration and reduced costs when used in dense wavelength division multiplexing (DWDM) systems.

The "Summary of the Invention" does not necessarily disclose all the inventive features. The invention may reside in a sub-combination of the disclosed features.

BRIEF DESCRIPTION OF THE DRAWINGS

The invention will be now explained by way of example only and with reference to the following drawings.

Similar references are used in different figures to denote similar components.

DETAILED DESCRIPTION OF THE EMBODIMENTS

Definition of some terms is provided next in conjunction with the above-referenced bit-reversal method for a better understanding of the present invention.

Index "n" is used for the order of the bits in the normal-ordered array, where "n" takes value between 0 and (N−1). Index "m" is used for the order of the bits in the reverse-ordered array, and "m" takes value between 0 and (M−1), where N=M. The size of the array is $2^M$ (number of rows)×M (number of columns). The method according to the invention requires use of at least an array of the size $2^Q$ (number of rows)×Q (number of columns) of internal memory, where Q<M. Thus, for a given array to be reversed, Q can be selected according to availability of the internal memory, as it will be seen later.

A bit-reversal routine is an addressing scheme which operates in an auto-increment address mode, except that instead of incrementing the value of the address register, the bits in the address are reversed, e.g. "1000" becomes "0001" after bit-reversal. DSPs provided with bit-reversed addressing routines are usually much faster and allow for sequencing of multi-cycle memory access operations.

Bit reversing routines are executed "in-place" using the same memory locations for both the input and the output, thus reducing data size and algorithmic complexity.

Figure 1:
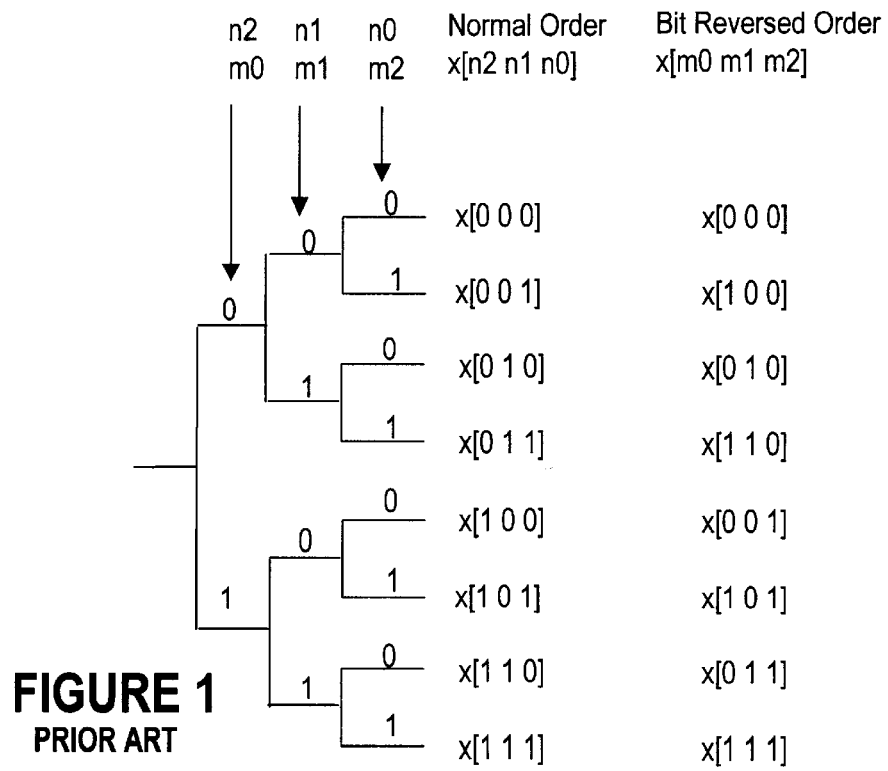
FIG. 1 shows the method of converting a normal-order 8-point array to a reverse-order array according to the prior art.

FIG. 1 shows a prior art example of how the bit-reversal method operates for N=3 bits, i.e. a $2^3$=8-point array. The conversions are executed with an "order sorting tree". In the order sorting tree of FIG. 1, the input is a normal-order 8-point array $x[n_2\ n_1\ n_0]$ and the output is considered a reversed 8-point array $x[m_2\ m_1\ m_0]$. The output array comprises the reverse-order according to the respective memory locations.

Bit reversal begins with the most significant bit, i.e. "$n_2$" in this example, which is equivalent to "$m_0$" of the bit-reversed array. The reversal continues with the bits in the order of their significance. If the most significant bit (MSB) $n_2$ is zero, i.e. $n_2$=0, the element is placed in the upper half of the tree, and if $n_2$=1, the element is placed in the lower half of the tree. The top half and bottom half sub-trees are subsequently sorted using the same criterion applied to the second most significant bit "$n_1$". This process is repeated until the array is completely sorted.

Conversely, for performing bit-reversed order sorting, the least significant bit, i.e. $m_2$ of a three bit-reversed array (or "$n_0$" of the normal array), is initially sorted. If $m_2$=0, the element is placed in the upper half of the tree and if $m_2$=1, the element is placed in the lower part of the tree. The top half and bottom half sub-trees are then sorted using the same criterion applied to the second least significant bit, i.e. for "$m_1$", etc. This process is repeated until the array is completely sorted.

Thus, to go from bit-reversed order to normal order, or vice versa, the bits of the desired value are reversed to produce the appropriate offset from a base memory location. That is, to obtain a bit reversed array for a desired value $X[n_2\ n_1\ n_0]$, the offset of $[n_0\ n_1\ n_2]$ is used from the beginning of the array. In the example of FIG. 1, since the base memory location is zero, the offset is the memory location itself. This routine is also called a "swapping algorithm" since in fact it performs a swapping of the values having indices that have the bit-reversed order of one another.

The term "one-bit" indicates that the reversal operation is performed for one bit at a time. More precisely, first the operation is performed for the bit $n_2/m_0$, next on $n_1/m_1$, etc. It is also possible to perform the reversal on two bits at the time, for example $n_3,n_2/m_0,m_1$, followed by $n_1,n_0/m_3, m_2$ and so on.

As indicated above, the swapping algorithm performs in-place bit-reversal of an array of data. When traversing an array during the bit-reversal routine, the values are swapped only once, e.g. if the memory location [001] is swapped with [100], the memory location [100] will not be swapped again with [001]. One way to avoid swapping the values twice is to set "i" to the bit-reversed value of "j" and swap only x[i] with x[j], if i<j, as shown in EQ 1:

xi=x[i];

xj=x[j];

x[i]=xj;

x[j]=xi;  EQ 1

To summarize, the bit reversal algorithm according to the prior art described above works efficiently on small arrays, but becomes very complex and time consuming when large arrays need to be bit-reversed.

The method according to the invention performs the bit reversal in two stages: in a first stage bit reversal is performed for the first "K" bits of the array, and in the second stage, bit reversal is performed in the internal memory, on sub-arrays of the size $2^Q$.

Figure 2A:
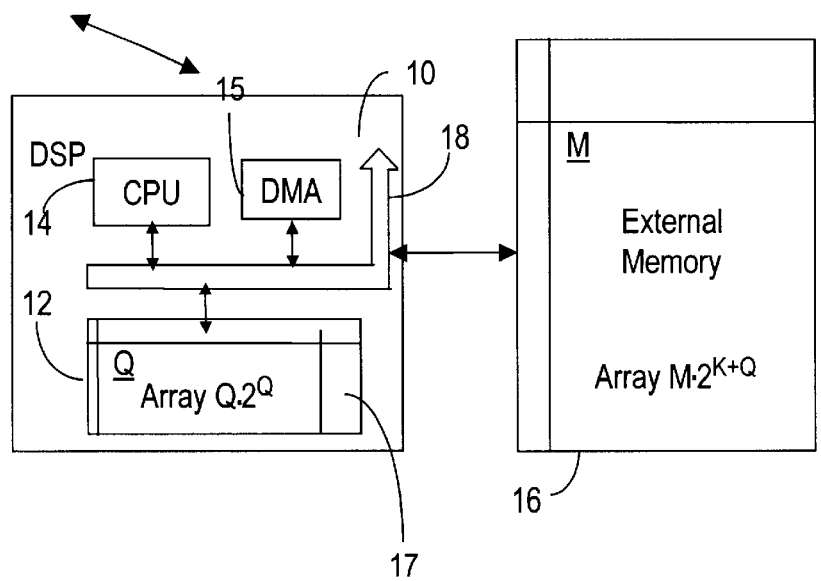
FIG. 2A is a block diagram illustrating the data transfer between an internal and an external memory.

FIG. 2A shows a block diagram of a DSP illustrating the main blocks involved in the method according to the invention. A DSP 10 includes a central processing unit (CPU) 14, a direct memory access (DMA) controller 15, an internal memory 12 and a bus 18 for carrying data between the CPU 14, DMA 15 and memory 12. Regarding internal memory 12, FIG. 2A illustrates only the internal array Q and index table 17 used for performing the second stage of the method of the invention. It is to be noted that the internal memory is larger than illustrated; the DSP may perform in parallel other operations. As well known, DMA controller 15 transfers data into/from memory location to another memory location. The DMA controller 15 can work independently from the CPU 14 and therefore, while CPU 14 accesses one memory location DMA controller 15 can access another memory location, so that full use of the DSP 10 capabilities is achieved in this way.

Figure 2B:
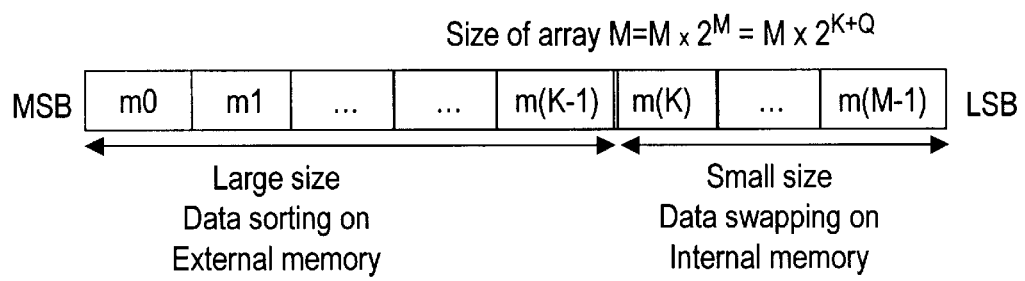
FIG. 2B is a diagram illustrating the bits of an entry point for illustrating the principle of the invention.

FIG. 2A also shows external memory 16 comprising the array to be bit-reversed. As discussed above, the size of the array is $M \times 2^M = M \times 2^{K+Q}$ and the size of the internal memory necessary for performing the method according to the invention is $Q \times 2^Q$. This is shown also in FIG. 2B for the general case when the array is in the reversed order in the external memory 16. The DMA 15 performs ordering for K bits from $m_0$ to $m_{K-1}$, and the CPU 14 orders the elements according to the remaining M−K=Q bits.

Figure 3:
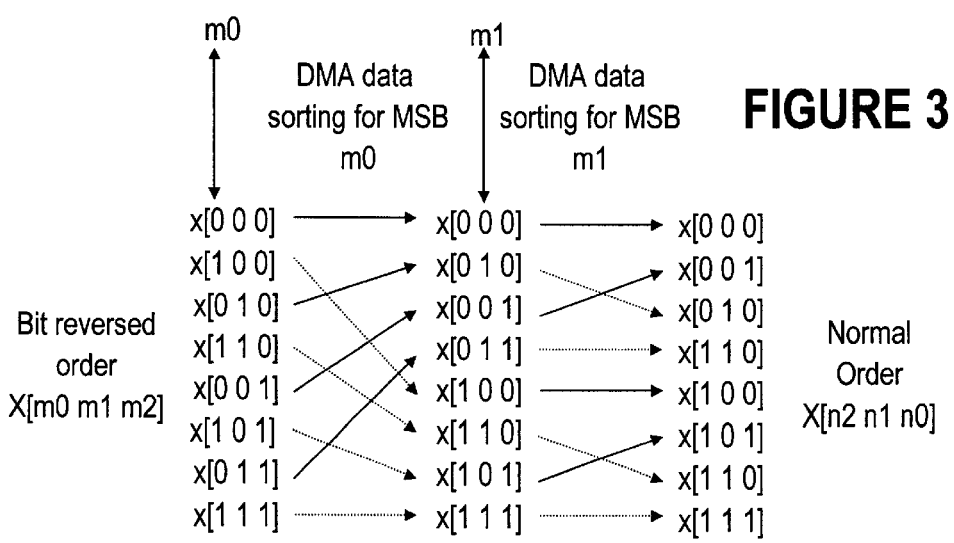
FIG. 3 is a diagram illustrating the first stage of a one-bit data sorting routine for partially sorting the large size data array M from a bit-reversed order to a normal order.

FIG. 3 is a diagram illustrating the first stage of a one-bit data sorting routine for partially reversing the array M from a bit-reversed order to a normal order. FIG. 3 and the ensuing description refer to a preferred embodiment by way of example only and without limitation to combination of features necessary for carrying the invention into effect.

As indicated above, the first stage is performed by the DMA controller 15, as in the current bit-reversal routines. It is to be noted that the DMA controller 15 regularly bursts data to/from the external memory 16 at the rate of one element per memory clock cycle.

Since the operation to be performed is a bit-reversal from the reverse order to the normal order, if the most significant bit (MSB) "$m_0$" of an element of the bit-reversed order array $x[m_0\ m_1\ m_2]$ is a logic "0", the element is placed in the upper half of the array. This is shown by the solid-lines on the left side of FIG. 3. If $m_0$ is a logic "1", the element is placed in the lower half of the array, as shown in dashed-lines. The top half and bottom half sub-arrays are then sorted using the same sorting criteria applied to the second most significant bit, $m_1$. The bits that were on the left side in reverse format, are now in the right side in the normal format.

Let's assume that array M has $2^{17}$ points and it needs to be bit-reversed on a uni-processor DSP platform with an available internal memory space Q of $2^{14}$. In this case, the DMA will reverse the first three MSB's (K=3), and the remainder of array M is sorted on the internal memory. To this end, sub-arrays of the size of array Q are imported from the external memory to the internal memory, one at a time, for sorting. In this example, there are $2^{17-14}=2^3=8$ sub-arrays that are transferred and sorted on internal memory 12.

Figure 4:
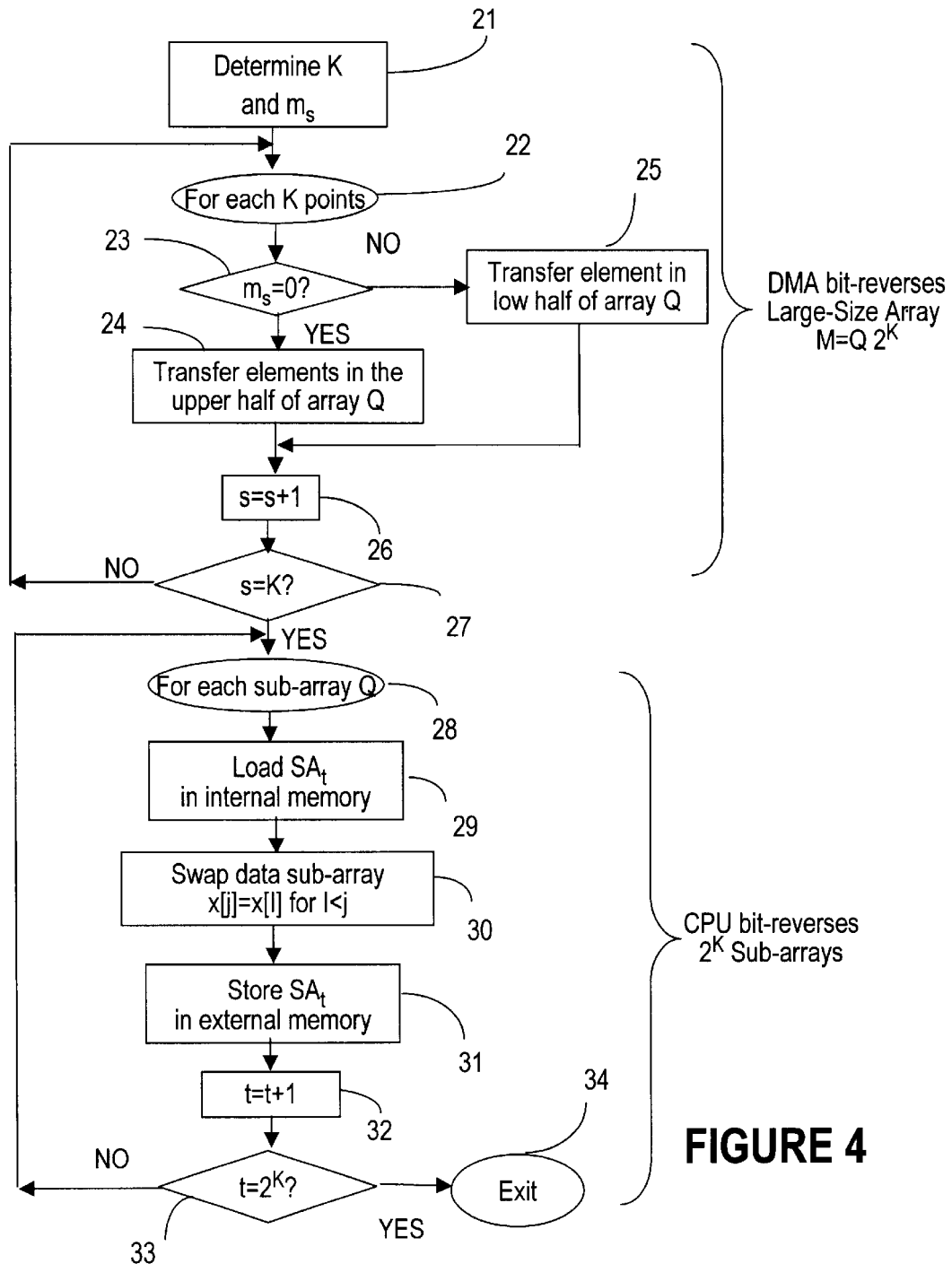
FIG. 4 is a flow chart illustrating the two-stage, one-bit sorting method according to the invention.

FIG. 4 illustrates a flow chart of the two-stage, one-bit sorting method for reversing a large, bit-reversed array M according to the invention. First, it is determined how many bits $m_s$, s=0, 1, . . . (K−1), have to be bit=reversed by the DMA 15 on the external memory, step 21. As explained above, this determination takes into account the size of the array and the available internal memory. For a general case, size of large array=M×$2^M$, and available size of internal memory=M×$2^Q$ To determine K, the size of the array is divided to the size of the available internal memory, and the result, let's call it C, is:

$$C = \frac{M \cdot 2^M}{M \cdot 2^Q} = 2^{M-Q} = 2^K$$

K is determined having in mind that a greater number of sub-arrays is preferred for efficiently using the internal memory 12.

Next, starting to step 22 to step 27, the DMA 15 sorts array M, for each entry point. As indicated above, since the array is reversed, the operation begins with $m_0$ for each entry point in the array, checks all for the value of $m_0$, step 23. Elements having the most significant bit (MSB) $m_0$=0 are placed in the upper half of the array; step 24. Elements with the MSB $m_0$=1 are placed in the lower half of the array; step 25. The top half and bottom half sub-arrays are then sorted using the same criteria applied now to the second most significant bit $m_1$, by increasing the index 'k', step 26 and repeating steps 22 to 27. After elements were rearranged based on the second MSB, the DMA repeats steps 22 to 27 for each bit $m_2$, $m_3$, . . . $m_{(K-1)}$ as an atomic transaction. At this point, the large array is partially sorted by the DMA 15, and the sorting for the remaining bits [$m_K$ to $m_{M-1}$] is performed by the CPU, as shown in steps 28–34.

The partially sorted sub-arrays $SA_t$ are now loaded one by one in the internal memory, step 29, sorted for the bits $m_K$ to $m_{M-1}$, step 30 and stored back in the external memory, step 31. Steps 29 to 33 are repeated as an atomic transaction, until all $2^K$ sub-arrays have been sorted and returned to the external memory 16.

Atomic transaction implies that a particular succession of steps is executed as an uninterrupted cycle. That is, during the execution of these steps, no subsequent request is admitted and no external input can modify the process unless the last step is completed.

Figure 5:
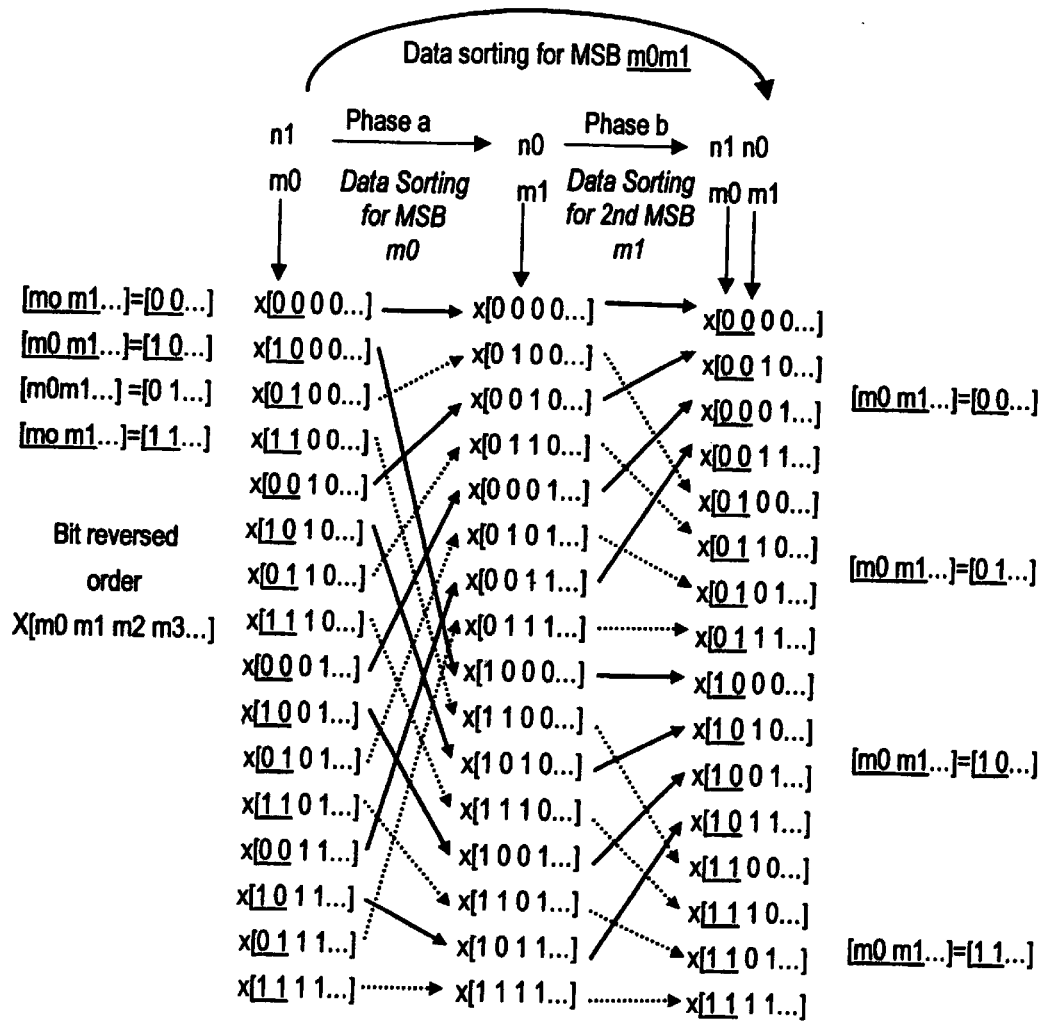
FIG. 5 is a diagram illustrating the first stage of a two-bit data sorting routine from bit-reversed to normal order, according to another embodiment of the invention.

As discussed above, one-bit data sorting technique can be extended to multi-bit data sorting by sorting two bits in each step in order to decrease the computational load. For example, the first stage can be also performed by the DMA controller 15 on a two-bit routine, as shown in FIG. 5. As the MSB are already ordered in-place, the access of the CPU 14 to the data to be transferred is no longer random, which significantly reduces the operating time. Also, the time is reduced even more as the swapping is performed in the internal memory.

As the internal memory is very expensive compared to the external memory, the two-stage method of the invention efficiently uses the system resources since it uses extensively the external memory and avoids a random access to the internal memory.

FIG. 5 is a diagram illustrating of a first stage two-bit data sorting routine from bit-reversed to normal order, according to another embodiment of the invention. In this example, the first most significant bit "$m_0$" is sorted during "phase a", using the one-bit sorting technique as discussed before. Then, the second most significant bit "$m_1$" is sorted during "phase b". By combining "phase a" with "phase b" in a single operation, see arrow A, a faster sorting routine is provided according to the invention.

As a result, DMA 15 processes in the first phase the first two MSB ($m_0\ m_1$) of a bit-reversed array $x[m_0\ m_1\ m_2\ . . .\ ]$. If ($m_o\ m_1$) is "00", the element is placed in the first quarter (1st) of the array, as shown in solid-thin-lines. If ($m_0\ m_1$) is "01", the element is placed in the second (2nd) quarter of the array, as shown in dashed-thick-lines. If ($m_o\ m_1$) is "10", the element is placed in the third (3rd) quarter of the array, as shown in solid-thick-lines. Finally, if ($m_o\ m_1$) is "11", the element is placed in the fourth (4th) quarter of the array, as shown in dashed-thin-lines.

Each quarter-array is then sorted using the same criterion applied to the second most significant group of two-bits ($m_2\ m_3$) and this process is repeated K/4 times, until each sub-array comprised of Q un-sorted bits can be wholly loaded into the internal memory 12.

If "K" is an odd number, the first most significant first bit (MSB) is initially sorted, then the 2-bit sorting routine/s is/are performed thereafter.

In the second stage, the CPU 14 performs small sub-arrays data swapping using the swapping algorithm, and since enough internal memory is available, each sorted sub-array can be wholly loaded into on-chip internal memory for swapping. After swapping, each sub-array is returned to the external memory.

Generalizing from one-bit and two-bit sorting routines shown in FIGS. 3 and respectively 5, a P-bit sorting routine is presented.

Assume that the first most significant "P" bits are [$m_0 m_1\ . . .\ m_{p-1}$], and the bit-reversed value is Bitr($n_0 n_1\ . . .\ n_{p-1}$). The MSBs K bits may be divided in groups of "P" bits (P<K). The entire array is thus divided into $2^P$ sub-arrays. DMA controller 15 performs data sorting, in a number of phases, using P bits in each phase. Thus:

(a) Elements with all most significant P-bits "logic zero", $$(\overline{00\ldots 0}^{Pbits})^{th}.$$

are placed in the first sub-array Bitr $$\overline{00\ldots 1}^{Pbits},$$

(b) Next, the DMA sorts the elements having the last bit in the first group of P-bits "logic one", i.e.

$$(\overline{00\ldots 1}^{Pbits})^{th}.$$

and places the sorted elements into the second sub-array Bitr i.e. $\overline{00\ldots 0}^{Pbits},$ (c) The DMA continues sorting routine until the elements with all P bits "logical one", i.e.

$$\overline{11\ldots 1}^{Pbits}$$

are sorted. At this point, all $2^P$ possibilities and the first group of "P" most significant bits (MSB) have been sorted.

(d) The {first, second, ..., Bitr$(m_0 m_1 \ldots m_{P-1})^{th}$, ..., $2^{P\,th}$} sub-arrays are then sorted using the same criteria applied on the second group of "P" most significant P-bits, $[m_P m_{P+1} \ldots m_{2\,P-1}]$.

Steps (a) to (d) are repeated for $2^P$ sub-arrays, or $K/2^P$ ($K \geq 2$) times until each sub-array can be wholly loaded into on-chip internal memory. In other words, $K/2^P$ data transfers are required for sorting all "K" bits. If K=1, the bit-sorting routine may be combined with the data transfer for the swapping stage. As mentioned before, if DMA sorts one bit at the time K/2 data transfers are required for sorting all "K" bits; if two bits are sorted each time, K/4 data transfers are required for sorting all "K" bits.

It is assumed that $K/2^P$ is an integer. If $K/2^P$ is not an integer, "K" may be divided in $K = k_1 + k_2 + \ldots + k_i + \ldots$, where "$k_i$" are selected as desired.

During the second stage, as discussed above in connection with for example FIG. 4, CPU 14 performs data swapping on the sub-arrays, according to the known approach.

The computational load (CL) is determined next for showing the benefits of using the method according to the invention. It is assumed that for each random access to an element of external memory, each load operation requires about 15~33 CPU cycles, and each store operation requires 7~23 CPU cycles, depending on the memory type. Without including an additional delay for the worst case, it can be assumed that a load-store trip takes place in approximately 30 CPU cycles. Thus, the computational load of the prior art (CLpa) bit reversal method is approximately in the order of:

$$CLpa = M \times 30 \text{ CPU} = Q \cdot 2^K \cdot 30 \text{ CPU cycles}$$

For the one-bit sorting according to the invention, the computational load is $$CL_{1-bit} = Q \cdot 2^K \text{ CPU cycles} + \{Q \cdot 2^K \cdot K \cdot 2/2 + Q \cdot 2^{k} \cdot 2\} \text{ DMA cycles} == \{Q \cdot 2^K \text{ CPU cycles} + (K+2)\ Q \cdot 2^K \text{ DMA cycles}\} < CLpa.$$

In a similar way, the computational load for the two-bit sorting is $$CL_{2-bit} = \{Q \cdot 2^K \text{ CPU cycles} + (K/2+2)\ Q \cdot 2^K \text{ DMA cycles}\} < CLpa.$$

For the general case, computational load for the K-bit sorting is:

$$CL_{K-bit} = \{Q \cdot 2^K \text{ CPU cycles} + 4\ Q \cdot 2^K \text{ DMA cycles}\} << CL_{pa}.$$

Industrial Application

To provide performance monitoring in an optical network, there is a known technique to apply a shallow dither tone to an optical signal to provide channel/wavelength identification. The dither is encoded in the signal at the network place where the dither has to be introduced, and then tapped and decoded wherever performance monitoring of the network is required. During frequency shift keying (FSK) demodulation, the signal-to-noise ratio (S/N) is very low, thus a large size FFT needs to extract the CID (channel identification) information from the dither tone. The presently available DSPs cannot meet the real-time requirements. It is not advisable to provide two DSPs on one platform, as the CID decoder board has not enough space to receive two DSPs due to the dense integration requirements. Moreover, multi-processor schemes need more hardware and a complex real-time operating time system which increases the development costs and cycle. The invention provides for improved dense integration and reduced costs when used with DWDM systems.

The invention can be implemented in digital electronic circuitry, or in computer hardware, firmware, software, or in combinations thereof, e.g. ASIC or FPGA (field programmable gate array). Apparatus of the invention can be implemented in a computer program product tangibly embodied in a machine-readable storage device for execution by a programmable processor; and the actions can be performed by a programmable processor executing a program of instructions by operating on input data and generating output.

It is contemplated that the method described above can be used in a variety of digital transforms, e.g., FFT, DCI, IDCT, DST, FWT, FHT, or any other transforms which require bit-reversal of large size arrays.

Numerous modifications, variations, and adaptations may be made to the particular embodiments of the invention without departing from the scope of the invention, which is defined in the claims.

What is claimed is:

1. A method for bit reversal of large data array on a uni-processor platform, comprising:

determining the ratio K between the size $M \times 2^M$ of said large data array stored in an external memory, and the size $M \times 2^Q$ of a small array, available on an internal memory, such that K+Q=M;

performing an in-place bit reversal operation for K bits of said large data array on said external memory; and performing a bit reversal operation for the remaining Q bits of said large data array on said small array of said internal memory.

2. A method as claimed in claim 1 wherein said step of performing an in-place bit reversal operation comprises, for a reversal operation from a normal state to a reversed state:

(a) starting with the least significant bit $n_0$ for a bit $n_s$ of each pointer to said large data array, logically dividing an area of said large array subtended by said bit into an upper and a lower block;

(b) determining if said least significant bit $n_0$ is logic zero and moving the corresponding memory element into said upper block;

(c) determining if said least significant bit $n_0$ is logic one and moving the corresponding memory element into said lower block;

(d) incrementing "s" by "1" and repeating steps (a) to (d), until s=K, wherein said large data array comprises, upon sorting for said K bits, a plurality $2^K$ sub-arrays ($SA_t$) which are still ordered in the normal state.

3. A method as claimed in claim 1 wherein said step of performing an in-place bit reversal operation comprises, for a reversal operation from a reversed state to a normal state:

(a) dividing said K bits in "z" groups of P bits;

(b) starting with a first group of P most significant bits $[m_0, m_1, \ldots m_{P-1}]$ of each pointer to said large data array, logically dividing an area of said large array subtended by said first group in $2^P$ sub-arrays;

(c) determining the logic value of said bits $[m_0, m_1, \ldots m_{P-1}]$ and placing corresponding memory elements in corresponding sub-arrays of said $2^P$ sub-arrays according to said logic value;

(d) repeating steps (a) to (d) for K bits of each said pointer; wherein said large data array comprises, upon sorting for said K bits, a plurality $2^K$ sub-arrays ($SA_t$) which are still ordered in the reversed state.

4. A method as claimed in claim 1 wherein said step of performing an in-place bit reversal operation comprises, for a reversal operation from a reversed state to a normal state:

(a) starting with the most significant bit $m_0$ for a bit $m_s$ of each pointer to said large data array, logically dividing an area of said large array, subtended by said bit $m_s$, into an upper and a lower block;

(b) determining if said most significant bit $m_0$ is logic zero and moving the corresponding memory element into said upper block;

(c) determining if said most significant bit $m_0$ is logic one and moving the corresponding memory element into said lower block;

(d) incrementing "s" by "1" and repeating steps (a) to (d) until s=K, wherein said large data array comprises, upon sorting for said K bits, a plurality $2^K$ sub-arrays ($SA_t$) which are still ordered in the reversed state.

5. A method as claimed in claim 4 wherein said steps (a) to (d) are performed by a direct memory access controller (DMA).

6. A method as claimed in claim 4 wherein said step of performing a bit reversal operation for the remaining Q bits is performed by a central processing unit (CPU), said step comprising:

loading one said sub-array ($SA_t$) into said small array of said internal memory;

reversing the bits of said loaded sub-array ($SA_t$) from said reversed state to said normal state; and storing said bit-reversed sub-array into said external memory.

7. A method as described in claim 1 used for digital transform of data, which requires a bit-reversal procedure.

8. A method as described in claim 7 used for inverse discrete cosinus transform.

9. A method as described in claim 7 used for Fast Walsh Transform.

10. A method as described in claim 7 used for Fast Hadamard Transform.

11. A method as described in claim 7 used for fast Fourier transform.

12. A method as described in claim 11 used for performance monitoring in an optical network.

13. A method as described in claim 7 used for discrete cosinus transform.

14. A method as described in claim 13 used for performance monitoring in an optical network.

15. A method as described in claim 7 used for discrete sinus transform.

16. A method as described in claim 15, used for performance monitoring in an optical network.

17. A digital signal processor DSP for bit-reversal of a large data array of a size $M \times 2^M$ of bits, comprising:

an internal memory for storing a small array of a size $M \times 2^Q$;

a direct memory access (DMA) controller for performing a bit reversal operation on an external memory;

a central processing unit (CPU) for performing a bit reversal operation on said small array; and a bus between said internal memory, said CPU and said DMA for allowing bit transfer between said external and internal memories under control of said DMA controller during a first stage of said bit-reversal operation, and for allowing bit transfer between said internal memory and said external memory under control of said CPU during a second stage of said bit reversal operation.

* * * * *